USO05589721A

United States Patent [19]
Han et al.

[11] Patent Number: 5,589,721
[45] Date of Patent: Dec. 31, 1996

[54] DISPLAY APPARATUS UTILIZING MAGNETIC INTERACTION

[76] Inventors: Quansheng Han; Bruce Lahn, both of 863 Mass. Ave. #24, Cambridge, Mass. 02139

[21] Appl. No.: 570,501

[22] Filed: Dec. 11, 1995

[51] Int. Cl.$^6$ .............................. H02K 7/09; G09F 19/00
[52] U.S. Cl. .............................................. 310/90.5; 40/426
[58] Field of Search ................................. 335/302, 306; 310/90.5; 40/426, 429, 430; 446/129, 131, 136

[56] References Cited

U.S. PATENT DOCUMENTS

| | | | |
|---|---|---|---|
| 3,196,566 | 7/1965 | Littlefield | 40/411 |
| 3,783,550 | 1/1974 | Andrews | 46/45 |
| 4,011,674 | 3/1977 | Jacobson | 40/39 |
| 4,178,707 | 12/1979 | Littlefield | 40/426 |
| 4,382,245 | 5/1983 | Harrigan | 335/306 |
| 4,789,803 | 12/1988 | Jacobsen et al. | 310/309 |
| 5,182,533 | 1/1993 | Ritts | 335/306 |

*Primary Examiner*—Cassandra C. Spyrou
*Assistant Examiner*—Raymond M. Barrera
*Attorney, Agent, or Firm*—Douglas D. Zhang

[57] ABSTRACT

A display apparatus utilizes magnetic interaction to achieve suspension and electromagnetic interaction to maintain continuous motion. The display apparatus has a base assembly including an anchoring point, and a plurality of spaced first magnets disposed in spaced relation relative to the anchoring point; a suspension member including a longitudinal axis, opposite two ends, a second magnet, and a radially disposed third magnet member, and wherein the first magnets are operable to magnetically support the suspension member in a suspended state; a tether for tethering the suspension member to the anchoring point; and an electromagnet for electromagnetically impelling the third magnet member when the suspension member is rotated about its longitudinal axis thereby maintaining the rotation of the suspension member.

18 Claims, 4 Drawing Sheets

DISPLAY APPARATUS UTILIZING MAGNETIC INTERACTION

BACKGROUND OF THE INVENTION

1. Field of the Invention

The present invention relates generally to a display apparatus. More particularly, the present invention relates to a display apparatus which unitizes magnetic interaction to achieve suspension and electromagnetic interaction to maintain continuous motion.

2. Description of the Prior Art

In recent years, people have designed various display apparatuses utilizing magnetic suspension that give the illusion of free float. One example of such display apparatuses is disclosed in U.S. Pat. No. 5,182,533. This display apparatus includes a suspension member and a base assembly each having a set of magnets. The two sets of magnets are positioned and polarized such that the base assembly is operable to magnetically support the suspension member in a substantially horizontal suspended state. This suspended state, however, is very unstable. Therefore, to stabilize the suspension member in the suspended state, the display apparatus further includes a lateral support member which engages in abutting contact with one end of the suspension member. While this and other prior art display apparatuses have operated with varying degrees of success, they are unsatisfactory in one or more respects. For example, one deficiency attendant with the prior art display apparatuses is that they do not have any means to maintain the rotation of the suspension member after such rotation is manually initiated.

Another deficiency attendant with the prior art display apparatuses is that the inflexible, apparently visible, physical contact between the lateral support member and the suspension member reduces the illusion of anti-gravitational free float.

Yet another deficiency attendant with some of the prior art display apparatuses is that they are usually expensive to manufacture and purchase, and inherently complex in construction.

Therefore, it has been known that it would be desirable to have a novel display apparatus which is operable to maintain the rotation of the suspension member, which provides an enhanced illusion of free float, which is lightweight and inexpensive to manufacture and purchase, which is characterized by ease of utilization and simplicity of construction, which is highly efficient in operation, and which further reduces to an absolute minimum the assorted deficiencies associated with the prior art display apparatuses.

SUMMARY OF THE INVENTION

Therefore, it is an object of the present invention to provide a novel display apparatus which utilizes magnetic interaction to achieve suspension and electromagnetic interaction to maintain continuous motion.

Another object of the present invention is to provide such a display apparatus which includes a suspension member and a base assembly operable to magnetically support the suspension member in a suspended state.

Another object of the present invention is to provide such a display apparatus which is operable to stabilize the suspension member in the suspended state.

Another object of the present invention is to provide such a display apparatus which is operable to give an enhanced illusion of free float.

Another object of the present invention is to provide such a display apparatus which is operable to maintain the rotation of the suspension member after such rotation is manually initiated.

Another object of the present invention is to provide such a display apparatus which is operable to give the illusion of perpetual motion.

Another object of the present invention is to provide such a display apparatus which is lightweight, and relatively inexpensive to manufacture and purchase.

Yet another object of the present invention is to provide such a display apparatus which is characterized by ease of utilization, and simplicity of construction.

Still another object of the present invention is to provide such a display apparatus which is operable to obtain the individual benefits and advantages to be derived from the related prior art while avoiding the assorted detriments individually associated therewith.

Further objects and advantages are to provide novel and improved elements and arrangements thereof in a display apparatus for the purposes described, and which is dependable, economical, durable, and fully effective in accomplishing its intended purposes.

These and other objects and advantages are achieved in a novel display apparatus which includes a base assembly including an anchoring point, and a plurality of spaced first magnets disposed in spaced relation relative to the anchoring point; a suspension member including a longitudinal axis, opposite two ends, a second magnet, and a radially disposed third magnet member, and wherein the first magnets are operable to magnetically support the suspension member in a suspended state; means for tethering the suspension member to the anchoring point; and means for magnetically impelling the third magnet member when the suspension member is rotated about its longitudinal axis thereby maintaining the rotation of the suspension member.

These and other objects and advantages of the present invention will become more apparent from the following detailed description of the preferred embodiments of the invention taken in combination with the accompanying drawings and the attached claims.

DESCRIPTION OF THE PREFERRED EMBODIMENT

First Embodiment

Figure 1:
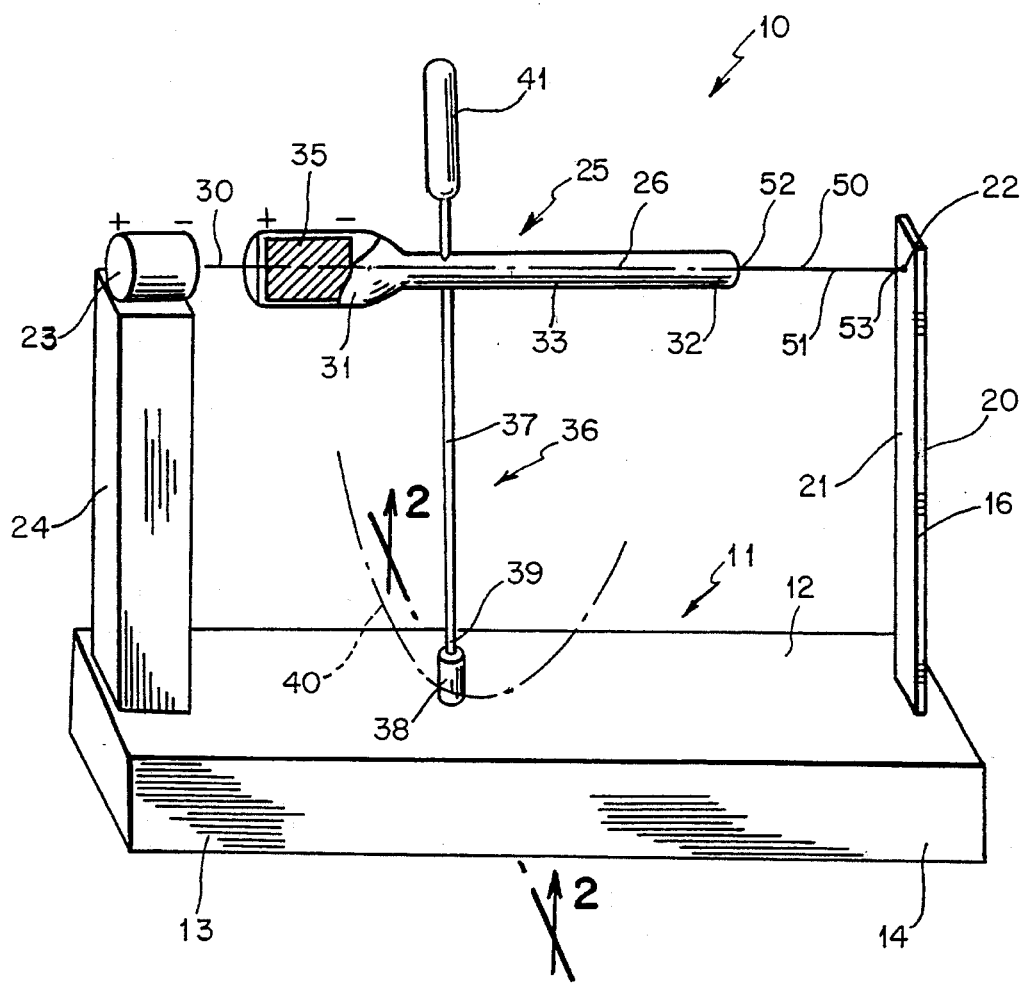
FIG. 1 is a perspective, partly exposed, side, elevation view of the first embodiment of the display apparatus of the present invention shown in a typical operative configuration.
Figure 2:
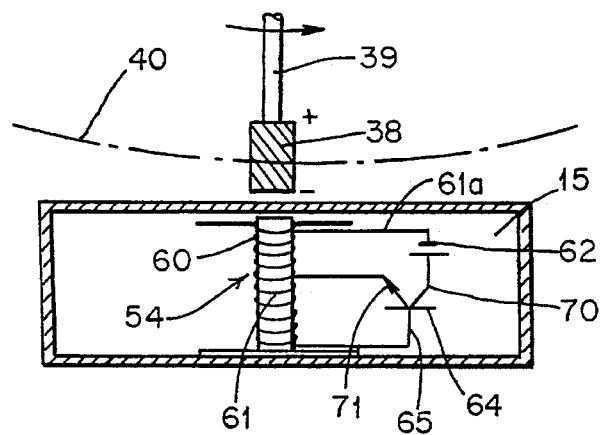
FIG. 2 is an enlarged, fragmentary, sectional view taken from a position along line 2—2 of FIG. 1, and which shows the magnetic impelling means.

Referring more particularly to the drawings, the first embodiment of the display apparatus of the present invention is generally indicated by the numeral 10 in FIG. 1. As best shown in FIGS. 1 and 2, the display apparatus includes a base assembly 11 which includes a substantially rectangular-shaped horizontal base member 12 having a first end 13, an opposite second end 14, an internal cavity 15, and an opening (not shown) which provides access to the cavity. Mounted on the second end 14 of the base member 12 is an upright support bar 16 which has an exterior surface 20 and an opposite interior surface 21. The interior surface 21 defines an anchoring point 22. The base assembly 11 further includes a substantially cylinder-shaped first permanent magnet 23 which is disposed in spaced relation relative to the anchoring point 22 and which is mounted on a support post 24 that is mounted on the first end 13 of the base member 12.

The display apparatus 10 further includes an axle or suspension member 25 which is disposed between the first magnet 23 and the anchoring point 22, and has a substantially elongated main body 26. The main body 26 is substantially cylindrical in its cross-sectional shape and has a longitudinal axis 30, an enlarged first end 31 which is adjacent to the first magnet 23, a second end 32 which is opposite to the first end 31, and an intermediate portion 33. Axially embedded in the enlarged first end 31 is a substantially cylinder-shaped second permanent magnet 35. The suspension member 25 further includes a radially disposed third magnet member 36 which includes a rod 37 which is radially mounted on the intermediate portion 33 of the suspension member 25, and a substantially cylinder-shaped coupling magnet 38 which is axially mounted on the outer end 39 of the rod 37 and defines a circular path of travel 40 above the base member 12 when the suspension member 25 is rotated about its longitudinal axis 30. To facilitate the rotation of the suspension member 25, the third magnet member 36 further includes a substantially paddle-shaped counterweight 41 which is radially mounted on the middle portion 33 of the suspension member 25 and in the opposite direction of the rod 37 to form an axial extension of the rod 37.

The display apparatus 10 further includes a means 50 for tethering the suspension member 25 to the anchoring point 22. The tethering means 50 comprises a flexible string 51 having a first end 52 which is affixed to the second end 32 of the suspension member 25, and an opposite second end 53 which is affixed to the anchoring point 22. The string 51 is very thin and preferably made from transparent material to make it invisible when viewed from a distance; it also has a predetermined length such that the second magnet 35 of the suspension member 25 is disposed in close proximity to the first magnet 23.

As shown in FIG. 1, both the first magnet 23 and the second magnet 35 are axially polarized and have the same polarity configuration. More particularly, the first magnet 23 is substantially coaxial with and polarized to attract the second magnet 35 such that together with the tethering means 50 the first magnet 23 is operable to magnetically support the suspension member 25 in a suspended state where the suspension member 25 is in spaced relation relative to the first magnet 23, the base member 12 and the anchoring point 22, respectively.

The display apparatus 10 further includes a means 54 for electromagnetically impelling the third magnet member 36 when the suspension member 25 is rotated about its longitudinal axis 30 thereby maintaining the rotation of the suspension member 25. As shown in FIG. 2, the electromagnetic impelling means 54 is installed in the internal cavity 15 of the base member 12 and includes a stationary induction coil 60 which is disposed adjacent to the circular path of travel 40 and has an iron core 61 which is of ferromagnetic type. The electromagnetic impelling means 54 further includes an electric circuit 61a which includes a source of direct current electric potential such as a conventional battery 62, and a triode or a transistor of the NPN type 64 which functions as a control switch. The opposite ends of the induction coil 60 are connected across the battery 62 through the transistor 64. More specifically, the base 65 of the transistor 64 is connected to one end of the coil 60, the collector 70 of the transistor 64 is connected to the positive end of the battery 62 while the negative end of the battery 62 is connected to the other end of the coil 60. The emitter 71 of the transistor 64 is connected to an intermediate winding of the coil 60. As should be understood, when passing the coil 60 the coupling magnet 38 produces induced current in the coil 60 to turn on the transistor 64 which in turn releasably connects the battery 62 across the coil 60 momentarily to produce a pulse magnetic field which impels the coupling magnet 38.

Second Embodiment

Figure 3:
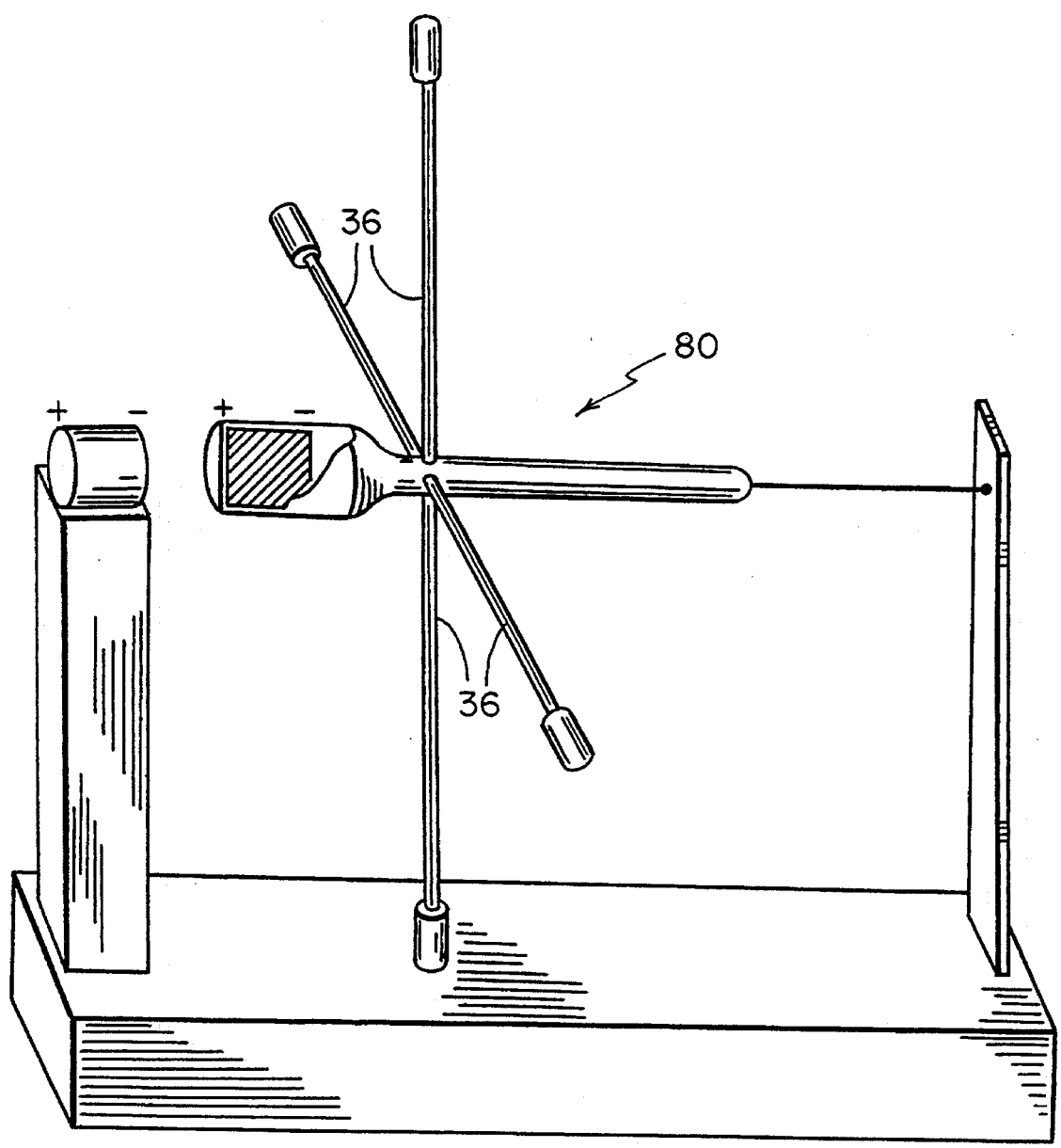
FIG. 3 is a perspective, partly exposed, side, elevation view of the second embodiment of the display apparatus of the present invention shown in a typical operative configuration.

The second embodiment of the display apparatus of the present invention is generally indicated by the numeral 80 in FIG. 3. As should be understood, the display apparatus 80 is identical to the display apparatus 10 except that its suspension member 25 employs four third magnet members 36 which are disposed evenly or otherwise in a predetermined, balanced pattern relative to the suspension member 25.

Third Embodiment

Figure 4:
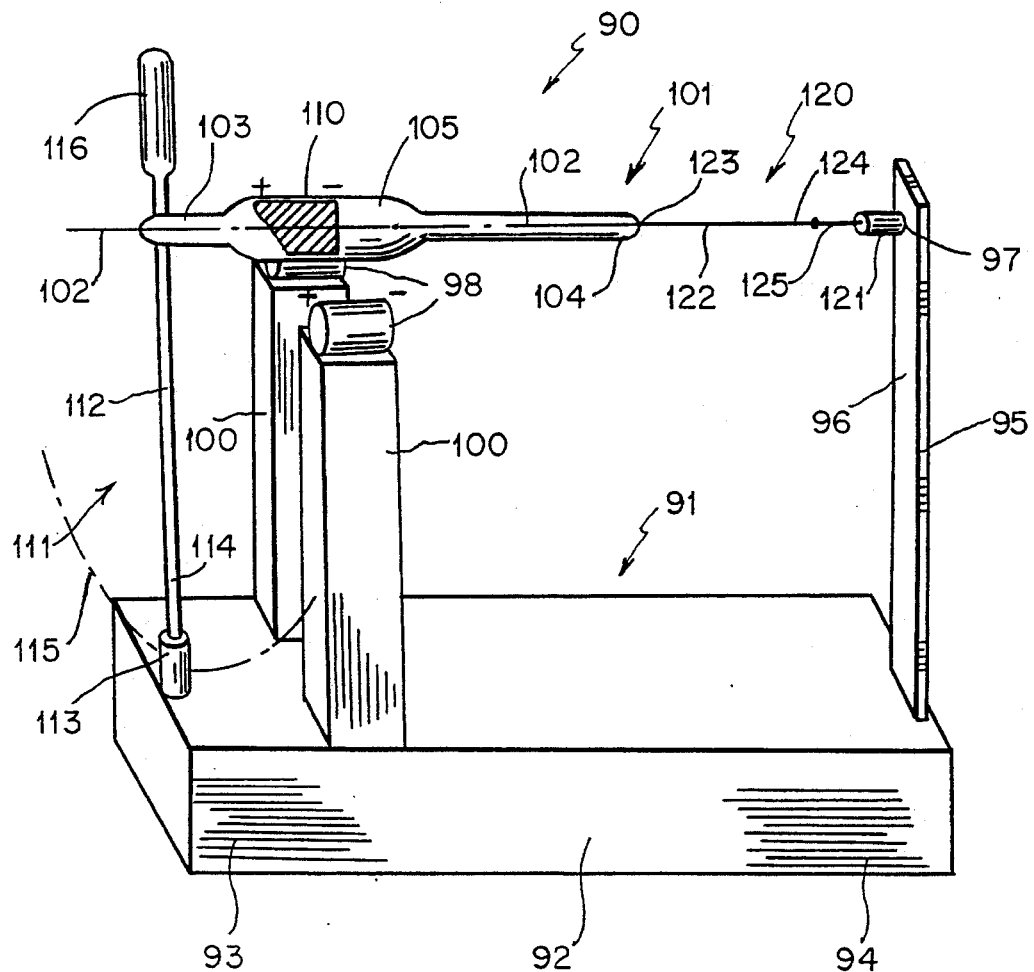
FIG. 4 is a perspective, partly exposed, side, elevation view of the third embodiment of the display apparatus of the present invention shown in a typical operative configuration.

The third embodiment of the display apparatus of the present invention is generally indicated by the numeral 90 in FIG. 4, and includes a base assembly 91. The base assembly 91 includes a substantially rectangular-shaped horizontal base member 92 which has a first end 93, an opposite second end 94, an internal cavity (not shown), and an opening (not shown) which provides access to the cavity. Mounted on the second end 94 of the base member 92 is an upright support bar 95 whose interior surface 96 defines an anchoring point 97. The base assembly 91 further includes two identical, substantially cylinder-shaped first permanent magnets 98 which are individually mounted on two spaced support posts 100 which are in turn mounted on the base member 92 and adjacent to the first end 93. The two first magnets 98 are disposed in substantially parallel, spaced relation one to the other and in equal spaced relation relative to the anchoring point 97. Furthermore, the two first magnets 98 are axially polarized and have the same polarity configuration and magnetic strength.

The display apparatus 90 further includes an axle or suspension member 101 which is disposed symmetrically above the two first magnets 100. The suspension member 101 has a longitudinal axis 102, a first end 103, an opposite second end 104, and an enlarged intermediate portion 105. The suspension member 101 further includes a substantially cylinder-shaped second permanent magnet 110 which is embedded in the intermediate portion 105, and a radially disposed third magnet member 111. The third magnet member 111 includes a rod 112 which is radially mounted on the first end 103 of the suspension member 101, and a substantially cylinder-shaped coupling magnet 113 which is mounted on the outer end 114 of the rod 112 and defines a circular path of travel 115 above the base member 92 when the suspension member 101 is rotated about its longitudinal axis 102. To facilitate the rotation of the suspension member 101, the third magnet member 111 further includes a substantially paddle-shaped counterweight 116 which is radially mounted on first end 103 of the suspension member 101 and in the opposite direction of the rod 112. Alternatively, as discussed in the display apparatus 80, the suspension member 101 employs a plurality of the third magnet members 111 (without any counterweights) to form a predetermined, balanced pattern. The second magnet 110 has the same polarity configuration as the first magnets 98. Furthermore, the second magnet 110 is disposed to coordinate with the two first magnets 98 such that the two first magnets 98 serve to repel the second magnet 110; in such a fashion, the first magnets 98 are operable to magnetically support the suspension member 101 in a substantially horizontal, suspended state where the suspension member 101 is in spaced relation relative to the first magnets 98, the anchoring point 97 and the base member 92, respectively.

The display apparatus 90 further includes means (not shown) for electromagnetically impelling the coupling magnet 113 when the suspension member 101 is rotated about its longitudinal axis 102 thereby maintaining the rotation of the suspension member 101. The electromagnetic impelling means, which is installed in the internal cavity of the base member 92, is identical to the electromagnetic impelling means 54 employed in the display apparatus 10, and therefore will not be discussed in further detail herein.

The display apparatus 90 further includes means 120 for tethering the suspension member 101 to the anchoring point 97 to stabilize same in its suspended state. The tethering means 120 comprises a substantially cylinder-shaped anchoring magnet 121 which is affixed to the anchoring point 97 on the support bar 95, and a flexible, transparent string 122. The string 122 has a first end 123 which is affixed to the second end 104 of the suspension member 101, and an opposite second end 124 which is affixed to a steel pin 125 which is perpendicularly attracted to the anchoring magnet 121. As should be understood, the flexible string 122 is very thin and has a predetermined length so that the second magnet 110 is disposed to coordinate with the first magnets 100.

Figure 5:
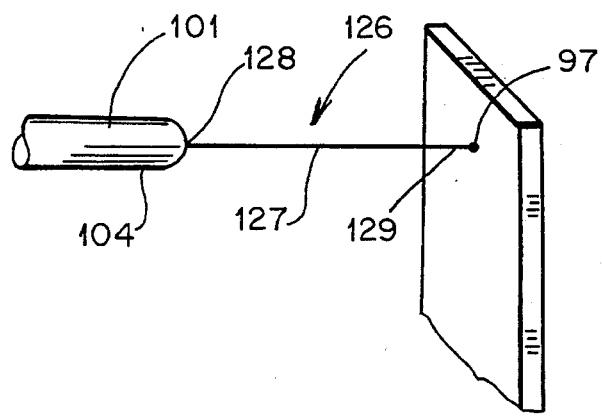
FIG. 5 is an enlarged, side, elevation view of another form of the tethering means.

FIG. 5 shows another form 126 of the tethering means. The tethering means 126 comprises a flexible, thin, transparent string 127 which has a predetermined length, a first end 128 which is affixed to the second end 104 of the suspension member 101, and an opposite end 129 which is affixed to the anchoring point 97.

Fourth Embodiment

Figure 6:
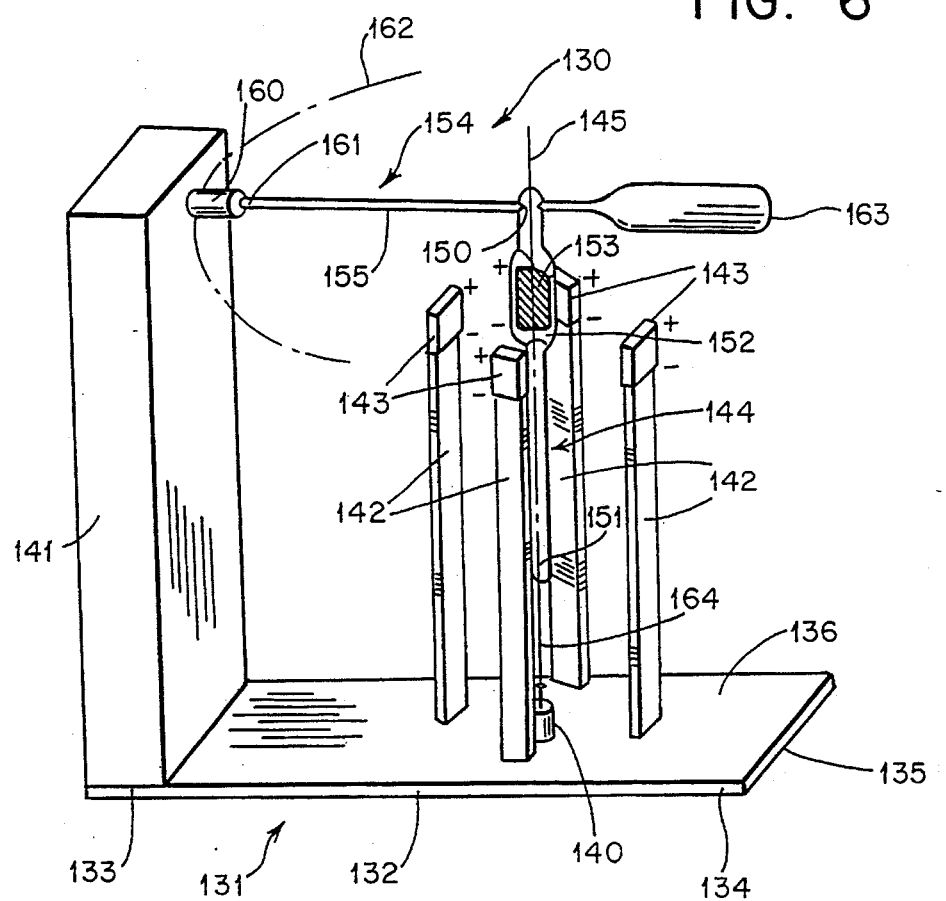
FIG. 6 is a perspective, partly exposed, side, elevation view of the fourth embodiment of the display apparatus of the present invention shown in a typical operative configuration.
Figure 7:
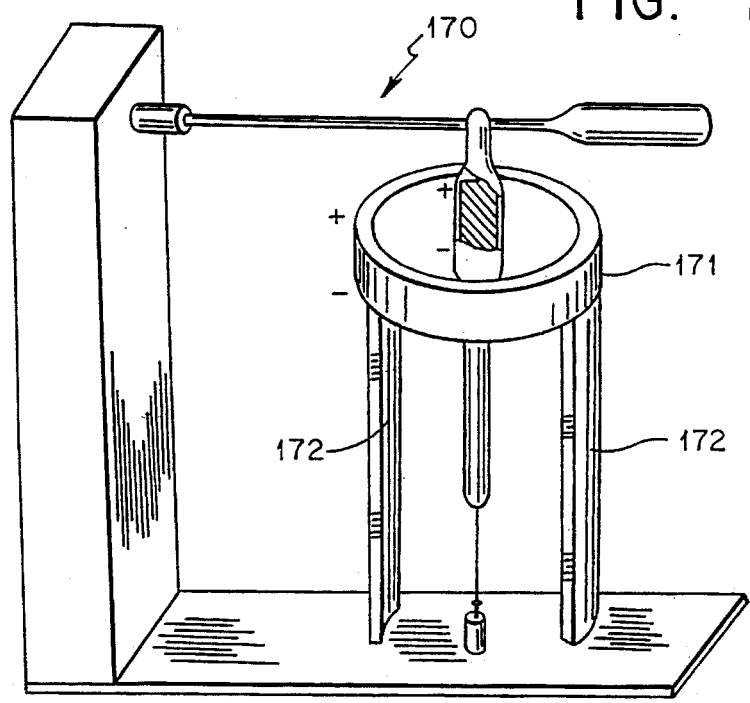
FIG. 7 is a perspective, partly exposed, side, elevation view of the fifth embodiment of the display apparatus of the present invention shown in a typical operative configuration.

The fourth embodiment of the display apparatus of the present invention is generally indicated by the numeral 130 in FIG. 6, and includes a base assembly 131. The base assembly 131 includes a substantially rectangular-shaped horizontal base member 132 having a first end 133, an opposite second end 134, a bottom surface 135, and an opposite top surface 136 which defines an anchoring point 140. Mounted on the first end 133 of the base member 132 is a substantially rectangular-shaped upright member 141 which has an internal cavity (not shown), and an opening which provides access to the cavity. Also mounted on the base member 132 are four identical upright posts 142 which are disposed evenly or symmetrically around the anchoring point 140. Each of the posts 142 supports a first permanent magnet 143 in spaced relation relative to the anchoring point 140. The four magnets 143 have the same polarity configuration and magnetic strength.

The display apparatus 130 further includes an axle or suspension member 144 which is substantially vertically disposed above the anchoring point 140. The suspension member 144 has a longitudinal axis 145 which is coaxial with the anchoring point 140, a top or first end 150, an opposite bottom or second end 151, and an enlarged intermediate portion 152. Axially embedded in the enlarged intermediate portion 152 is a substantially cylinder-shaped second permanent magnet 153. The suspension member 144 further includes a radially disposed third magnet member 154 which includes a rod 155 radially mounted on the first end 150, and a substantially cylinder-shaped coupling magnet 160 mounted on the outer end 161 of the rod 155 and defines a circular path of travel 162 adjacent to the upright member 141 when the suspension member 144 is rotated about its longitudinal axis 145. To facilitate the rotation of the suspension member 144, the third magnet member 154 further includes a substantially paddle-shaped counterweight which is radially mounted on the first end 150 of the suspension member 144 and forms an axial extension of the rod 155. Alternatively, the suspension member 144 employs a plurality of the third magnet members 154 (without any counterweights) to form a predetermined, balanced pattern.

The second magnet 153, which is axially polarized, has the same polarity configuration as the four first magnets 143. In FIG. 6, the second magnet 153 is coordinated with the four first magnets 143 such that the first magnets 143 are operable to repel the second magnet 153 upwardly; in such a fashion, the first magnets 143 are operable to magnetically support the suspension member 144 in a substantially vertical, suspended state where the suspension member 144 in spaced relation relative to the first magnets 143, the anchoring point 140 and the base member 132, respectively. As should be understood, suspension could also be achieved by slightly lowering and reverting the second magnet 153 to enable the four first magnets 143 to magnetically attract the second magnet 153 upwardly thereby suspending the suspension member 144.

The display apparatus 130 further includes means (not shown) for electromagnetically impelling the coupling magnet 160 when the suspension member 144 is rotated about its longitudinal axis 145 thereby maintaining the rotation of the suspension member 144. Since the electromagnetic impelling means, which is installed in the internal cavity of the upright member 141, is identical to the electromagnetic impelling means 54 employed in the display apparatus 10, it will not be discussed in further detail herein.

Furthermore, the display apparatus 130 includes means 164 for tethering the suspension member 144 to the anchoring point 140 to stabilize same in its suspended state. Since the tethering means 164 is substantially identical to the tethering means 120 used in the display apparatus 90, it will not be discussed any further here. As should be understood, the display apparatus 130 could alternatively use a means which is substantially identical to the tethering means 126 discussed earlier to achieve the same result.

Fifth Embodiment

The fifth embodiment 170 of the display apparatus of the present invention is identical to the display apparatus 130 except that the four first magnets 143 form a horizontal, single ring-shaped magnet 171 which is supported by two parallel, spaced upright posts 172.

OPERATION

The operation of the five embodiments of the present invention is believed to be readily apparent, and therefore is briefly summarized at this point by referring to the operation of the first embodiment 10 only.

In operation, a user (not shown) first sets the suspension member 25 in its suspended state. The suspension member 25 is able to give an enhanced illusion of free float because the flexible string 51 is almost invisible when viewed from a distance. The user then manually rotates the suspended suspension member 25 about its longitudinal axis 30, which in turn causes the coupling magnet 38 to move along its circular path of travel 40. When the coupling magnet 38 approaches the induction coil 60, the iron core 61 first attracts the coupling magnet 38. When passing the induction coil 60, the coupling magnet 38 produces a momentary induction current in the coil 60 which in turn turns on the transistor 64 to releasably connect the battery 62 across the coil 60 momentarily to produce a pulse magnetic field. As should be understood, the magnet field impels the leaving coupling magnet 38 thereby maintaining the rotation of the suspension member 25.

Also, as should be understood, initially there is no or little torque in the flexible string 51. However, rotation of the suspension member 25 gradually builds up torque to a point where the suspension member 25 will stop rotating and then start to rotate in a reverse direction, and so on. Such a rotation pattern will continue until the battery 62 is exhausted. Such a rotation will also give the illusion of perpetual motion because the electromagnetic impelling means 54 is normally invisible.

Also, as should be understood, if the user slightly rotates the suspension member 25, the suspension member 25 will oscillate with its coupling magnet 38 swinging back and forth around the induction coil 60. Such an oscillation motion pattern will continue until the battery 62 is exhausted.

Although the present invention has been herein shown and described in what is conceived to be the most practical and preferred embodiments, it is recognized that departures may be made therefrom within the scope of the present invention which is not to be limited to the illustrative details disclosed above.

Having described our invention, what we claim as new and desire to secure by letters patent is:

1. A display apparatus comprising:

a base assembly including an anchoring point, and a first magnet disposed in spaced relation relative to the anchoring point;

a suspension member disposed between the anchoring point and the first magnet and including a longitudinal axis, a first end which is adjacent to the first magnet, an opposite second end, a second magnet mounted on the first end thereof, and a third magnet member radially mounted thereon;

means for tethering the suspension member to the anchoring point;

wherein the first magnet is polarized to attract the second magnet so that the first magnet is operable to magnetically support the suspension member in a suspended state where the suspension member is in spaced relation relative to the first magnet, the anchoring point and the base assembly, respectively; and means for electromagnetically impelling the third magnet member when the suspension member is rotated about its longitudinal axis thereby maintaining the rotation of the suspension member.

2. A display apparatus as claimed in claim 1, wherein the tethering means includes a flexible string including a first end which is affixed to the second end of the suspension member, and an opposite second end which is affixed to the anchoring point.

3. A display apparatus as claimed in claim 2, wherein the third magnet member includes a rod which is radially mounted on the suspension member, and a coupling magnet which is mounted on the outer end of the rod and defines a circular path of travel when the suspension member is rotated about its longitudinal axis.

4. A display apparatus as claimed in claim 3, wherein the electromagnetic impelling means includes an induction coil which has an iron core and is disposed adjacent to the circular path of travel, and an electric circuit which includes a source of electric potential and a control switch, and wherein the control switch is operable by current induced in the coil when the coupling magnet passes the coil for releasably connecting the source of electric potential across the coil momentarily to produce a pulse magnetic field which impels the coupling magnet.

5. A display apparatus as claimed in claim 4, wherein the suspension member includes a plurality of the third magnet members.

6. A display apparatus utilizing magnetic interaction, comprising:

a base assembly including an anchoring point, and a plurality of spaced first magnets disposed in spaced relation relative to the anchoring point;

a suspension member including a longitudinal axis, opposite two ends, a second magnet mounted thereon, and a third magnet member radially mounted thereon, and wherein the first magnets are polarized to repel the second magnet so that they are operable to magnetically support the suspension member in a suspended state where the suspension member is in spaced relation relative to the first magnets, the anchoring point and the base assembly, respectively;

means for tethering the suspension member to the anchoring point thereby stabilizing the suspension member in its suspended state; and means for electromagnetically impelling the third magnet member when the suspension member is rotated about its longitudinal axis thereby maintaining the rotation of the suspension member.

7. A display apparatus as claimed in claim 6, wherein the third magnet member includes a rod which is radially mounted on the suspension member, and a coupling magnet which is mounted on the outer end of the rod and defines a circular path of travel when the suspension member is rotated about its longitudinal axis.

8. A display apparatus as claimed in claim 7, wherein the electromagnetic impelling means includes an induction coil which includes an iron core and is disposed adjacent to the circular path of travel, and an electric circuit which includes a source of electric potential and a control switch, and wherein the control switch is operable by current induced in the coil when the coupling magnet passes the coil for releasably connecting the source of electric potential across the coil momentarily to produce a pulse magnetic field which impels the coupling magnet.

9. A display apparatus as claimed in claim 8, wherein the tethering means includes a flexible string including a first end which is affixed to one end of the suspension member, and an opposite second end which is affixed to the anchoring point.

10. A display apparatus as claimed in claim 8, wherein the tethering means includes an anchoring magnet which is affixed to the anchoring point, a flexible string, and a steel pin which is perpendicularly attracted to the anchoring magnet, and wherein the string includes a first end which is affixed to one end of the suspension member, and an opposite second end which is affixed to the steel pin.

11. A display apparatus as claimed in claim 8, wherein the suspension member includes a plurality of the third magnet members.

12. A display apparatus utilizing magnetic interaction, comprising:
   a base assembly including an anchoring point, and a plurality of spaced first magnets which are disposed in spaced relation relative to the anchoring point;
   a suspension member including a longitudinal axis, opposite two ends, a second magnet axially mounted thereon, and a third magnet member radially mounted thereon, and wherein the first magnets are disposed around and magnetically support the suspension member in a suspended state where the suspension member is in spaced relation relative to the first magnets, the anchoring point and the base assembly, respectively;
   means for tethering the suspension member to the anchoring point thereby stabilizing the suspension member in its suspended state; and
   means for electromagnetically impelling the third magnet member when the suspension member is rotated about its longitudinal axis thereby maintaining the rotation of the suspension member.

13. A display apparatus as claimed in claim 12, wherein the third magnet member includes a rod which is radially mounted on the suspension member, and a coupling magnet which is mounted on the outer end of the rod and defines a circular path of travel when the suspension member is rotated about its longitudinal axis.

14. A display apparatus as claimed in claim 13, wherein the electromagnetic impelling means includes an induction coil which includes an iron core and is disposed adjacent to the circular path of travel, and an electric circuit which includes a source of electric potential and a control switch, and wherein the control switch is operable by current induced in the coil when the coupling magnet passes the coil for releasably connecting the source of electric potential across the coil momentarily to produce a pulse magnetic field which impels the coupling magnet.

15. A display apparatus as claimed in claim 14, wherein the tethering means includes a flexible string including a first end which is affixed to one end of the suspension member, and an opposite second end which is affixed to the anchoring point.

16. A display apparatus as claimed in claim 14, wherein the tethering means includes an anchoring magnet which is affixed to the anchoring point, a flexible string, and a steel pin which is perpendicularly attracted to the anchoring magnet, and wherein the string includes a first end which is affixed to one end of the suspension member, and an opposite second end which is affixed to the steel pin.

17. A display apparatus as claimed in claim 14, wherein the first magnets form a single ring-shaped magnet.

18. A display apparatus as claimed in claim 14, wherein the suspension member includes a plurality of the third magnet members.

* * * * *